(12) United States Patent
Becker et al.

(10) Patent No.: US 10,325,476 B2
(45) Date of Patent: *Jun. 18, 2019

(54) AUTOMATIC ADJUSTMENT OF METRIC ALERT TRIGGER THRESHOLDS

(71) Applicant: International Business Machines Corporation, Armonk, NY (US)

(72) Inventors: Jennifer G. Becker, New Hill, NC (US); Venkatramanan Jeyaraman, Austin, TX (US); Mark D. Reinhardt, Apex, NC (US); Benjamin I. Rubinger, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,114

(22) Filed: Sep. 9, 2017

(65) Prior Publication Data

US 2017/0372588 A1 Dec. 28, 2017

Related U.S. Application Data

(63) Continuation of application No. 14/523,197, filed on Oct. 24, 2014, now Pat. No. 9,767,669, which is a continuation of application No. 13/830,998, filed on Mar. 14, 2013, now Pat. No. 9,767,668.

(51) Int. Cl.
*G06Q 10/10* (2012.01)
*G08B 21/18* (2006.01)

(52) U.S. Cl.
CPC ........... *G08B 21/182* (2013.01); *G06Q 10/10* (2013.01); *G06Q 10/107* (2013.01)

(58) Field of Classification Search
CPC ..... A61B 5/746; A61B 5/7275; A61B 5/0002; A61M 5/1723; A61M 5/14244;
(Continued)

(56) References Cited

U.S. PATENT DOCUMENTS 5,416,695 A  5/1995  Stutman et al.
6,449,739 B1  9/2002  Landan
(Continued)

OTHER PUBLICATIONS

"Improving Service Delivery Performance Using Predictive Intelligence to Prevent Network Meltdowns," [Online] NetScout Systems, Inc. © 2009-2010, White Paper WP_02_2009 Rev. B, Jun. 10, 2010 [retrieved Jul. 31, 2012], retrieved from the Internet: <http://www.netscout.com/library/White%20Papers/NetScout_wp_Improving_Service_Delivery_Performance.pdf>, 8 pgs.
(Continued)

*Primary Examiner* — Hoi C Lau
(74) *Attorney, Agent, or Firm* — Cuenot, Forsythe & Kim, LLC

(57) ABSTRACT

Arrangements relate to the automatic adjustment of an alert trigger threshold associated with a metric. In response to a determination that a predetermined alert trigger threshold associated with a metric is met, an alert notification can be sent to a plurality of users associated with the metric. Feedback on the alert notification can be received from one or more of the plurality of users. The alert trigger threshold can be adjusted based on the received feedback. Such adjusting can be performed using a processor.

15 Claims, 5 Drawing Sheets

(58) Field of Classification Search
CPC .. A61M 2205/18; G06F 3/048; G06F 3/0484; G06F 19/3406; G06F 19/3418; G08B 21/182; G06Q 10/10; G06Q 10/107
USPC ............... 340/531; 705/1.1, 7.11, 7.29, 7.32; 702/188, 182
See application file for complete search history.

(56) References Cited

U.S. PATENT DOCUMENTS

| | | | |
|---|---|---|---|
| 7,076,695 | B2 | 7/2006 | McGee et al. |
| 8,516,047 | B2 | 8/2013 | Castanho |
| 9,374,660 | B1 | 6/2016 | Tilles |
| 9,767,668 | B2* | 9/2017 | Becker Antley ..... G06Q 10/107 |
| 9,767,669 | B2* | 9/2017 | Becker Antley ..... G06Q 10/107 |
| 2004/0098459 | A1* | 5/2004 | Leukert-Knapp ..... G06F 11/327 709/206 |
| 2007/0005297 | A1 | 1/2007 | Bereniewicz et al. |
| 2008/0162210 | A1 | 7/2008 | Gu et al. |
| 2008/0270581 | A1* | 10/2008 | Ficery .................... G06Q 10/10 709/220 |
| 2010/0162215 | A1 | 6/2010 | Purcell et al. |
| 2010/0198649 | A1 | 8/2010 | Appleyard et al. |
| 2011/0154241 | A1* | 6/2011 | Skidmore ......... A61M 16/0051 715/771 |
| 2011/0169644 | A1* | 7/2011 | Muhsin ................ G08B 25/008 340/573.1 |
| 2012/0151396 | A1 | 6/2012 | S. et al. |
| 2013/0012830 | A1 | 1/2013 | Leininger et al. |
| 2014/0266714 | A1* | 9/2014 | Becker Antley ..... G06Q 10/107 340/540 |
| 2015/0042474 | A1* | 2/2015 | Becker Antley ..... G06Q 10/107 340/540 |
| 2017/0372588 | A1* | 12/2017 | Becker Antley ..... G06Q 10/107 |

OTHER PUBLICATIONS

"Oracle Enterprise Manager Administration 11g Release (11.1.0.1)—Chap. 1, Monitoring," [Online] © 2010, Oracle and/or its affiliates, Part No. E16790-03, Aug. 2010 [retrieved Feb. 18, 2013], retrieved from the Internet: <http://docs.oracle.com/cd/E11857_01/em.111/e16790/monitoring.htm>, 32 pgs.

Fitzjarrell, D. "Using Adaptive Thresholds to Monitor Oracle Database Performance," Oracle Database Journal, May 2012 [retrieved Jul. 31, 2012], retrieved from the Internet: <http://www.databasejournal.com/features/oracle/using-adaptive-thresholds-to-monitor-oracle-database-performance.html>, 5 pgs.

U.S. Appl. No. 13/830,998, Non-final Office Action, dated Mar. 6, 2015, 7 pg.

U.S. Appl. No. 13/830,998, Final Office Action, dated Jul. 8, 2015, 9 pg.

U.S. Appl. No. 13/830,998, Examiner's Answer, dated Apr. 21, 2016, 9 pg.

U.S. Appl. No. 13/830,998, Decision on Appeal, dated Mar. 1, 2017, 8 pg.

U.S. Appl. No. 13/830,998, Notice of Allowance, dated May 10, 2017, 5 pg.

U.S. Appl. No. 14/523,197, Non-Final Office Action, dated Mar. 10, 2015, 7 pg.

U.S. Appl. No. 14/523,197, Final Office Action, dated Jul. 8, 2015, 9 pg.

U.S. Appl. No. 14/523,197, Examiner's Answer, dated Apr. 27, 2016, 9 pg.

U.S. Appl. No. 14/523,197, Decision on Appeal, dated Mar. 1, 2017, 7 pg.

U.S. Appl. No. 14/523,197, Notice of Allowance, dated May 18, 2017, 5 pg.

* cited by examiner

200

```
Responsive to a determination that a
predetermined alert trigger threshold associated
with a metric is met, sending an alert
notification to a plurality of users associated
with the metric
205
```

```
Receiving feedback on the alert notification
from one or more of the plurality of users
210
```

```
Adjusting the alert trigger threshold based on
the received feedback
215
```

```
┌─────────────────────────────────────────────────────────┐
│ Company 123 – Trigger Feedback                    _ ☐ X │
├─────────────────────────────────────────────────────────┤
│ File  Edit  View  Go  Bookmarks  Tools  Help            │
│ ⇦ ⇨ ⟳ Ⓧ ⌂  http://company123.com/TriggerFeedback.html?▾│
├─────────────────────────────────────────────────────────┤
│                                                         │
│            TRIGGER ALERT FEEDBACK FORM                  │
│                                                         │
│   Trigger:         [ CustomerSatisfaction    ] ← 410    │
│                                                         │
│   Trigger Fire Date: [ 2013-01-01 ]  ← 415              │
│                                                         │
│   Person Submitting: [ Mr_A@company123.com ] ← 420      │
│                                                         │
│                                                  ← 425  │
│   Was the Trigger Helpful? [ No. Notification came too early ▾ ] │
│                                                  ← 435  │
│   Additional Comments:  ┌─────────────────────┐         │
│                         │ If I keep getting    │ ← 430   │
│                         │ these email alerts   │         │
│                         │ with only a 5% drop, │         │
│                         │ I'm likely to ignore │         │
│                         │ all such future      │         │
│                         │ emails!              │         │
│                         └─────────────────────┘         │
│   ( Submit )                                            │
└─────────────────────────────────────────────────────────┘
                    ⤶ 405
```

FIG. 4

AUTOMATIC ADJUSTMENT OF METRIC ALERT TRIGGER THRESHOLDS

BACKGROUND

Arrangements described herein relate to alert notification trigger thresholds associated with a metric.

A business may define and track measurable metrics that are relevant to the particular business. There are numerous metrics that a business can track. For example, a business may track the sales of one or more products, or it can track a measurement of customer satisfaction. Naturally, a business will strive to drive the metrics in a positive direction. For example, a business may strive to drive sales of a product upward or drive customer complaints downward.

The visibility of the metrics can be important to the success of a business, especially in scenarios where the metrics are trending in an undesired direction. This visibility can ensure that key personnel are made aware of the situation (e.g., a decline in sales and/or revenue or a decline in customer satisfaction) to allow them time to take actions to reverse the observed trend.

One way a business can ensure such visibility is to set an alert trigger threshold for each metric. When the particular metric falls above or below a predetermined threshold, depending on the metric, a notification can be automatically sent to one or more persons by electronic mail. The notification can provide details of the current state of the metrics. Such an approach can ensure that the relevant personnel are informed and positioned to take action. It can also alleviate personnel of the responsibility of having to manually view a report on a periodic basis.

However, it can be difficult to determine an appropriate alert trigger threshold. If the threshold is not accurately set, there is a potential for the value of the notification to be diminished. For instance, if an alert is triggered too early, the recipients of the notification may decide that no action is necessary or may disregard it entirely. Moreover, the notification system can lose credibility as an alert mechanism. Conversely, if an alert is triggered too late, it may no longer be possible to rectify the situation. Further, if too many electronic mail notifications are received, the recipient may become overburdened with having to individually review each of these electronic mail messages and the recipient may even ignore or delete the messages without having read them.

BRIEF SUMMARY

One or more embodiments disclosed within this specification relate to alert notification trigger thresholds associated with a metric and, more particularly, to automatically adjusting alert notification trigger thresholds associated with a metric.

An embodiment can include a method of automatically adjusting an alert trigger threshold associated with a metric. The method can include, responsive to a determination that a predetermined alert trigger threshold associated with a metric is met, sending an alert notification to a plurality of users associated with the metric. The method can further include receiving feedback on the alert notification from one or more of the plurality of users. The method can further include adjusting the alert trigger threshold based on the received feedback. The adjusting of the alert trigger threshold can be performed by a processor.

Another embodiment can include a system for automatically adjusting an alert trigger threshold associated with a metric. The system can have a processor. The processor can be configured to initiate executable operations. The executable operations can include, responsive to a determination that a predetermined alert trigger threshold associated with a metric is met, sending an alert notification to a plurality of users associated with the metric. Further, the executable operations can include receiving feedback on the alert notification from one or more of the plurality of users. The executable operations can also include adjusting the alert trigger threshold based on the received feedback.

Another embodiment can include a computer program product for automatically adjusting an alert trigger threshold associated with a metric. The computer program product can include a computer-readable storage medium having stored thereon program code that, when executed, configures a processor to perform a method. The method can include, responsive to a determination that a predetermined alert trigger threshold associated with a metric is met, sending, by the processor, an alert notification to a plurality of users associated with the metric. Further, the method can include receiving, by the processor, feedback on the alert notification from one or more of the plurality of users. The method can also include adjusting, by the processor, the alert trigger threshold based on the received feedback.

BRIEF DESCRIPTION OF THE SEVERAL VIEWS OF THE DRAWINGS

FIG. 2 is a flow chart illustrating a method of adjusting an alert trigger associated with a metric in accordance with another embodiment disclosed within this specification.

FIG. 4 is a webpage for adjusting an alert trigger associated with a metric in accordance with one embodiment disclosed within this specification.

DETAILED DESCRIPTION

Figure 1:
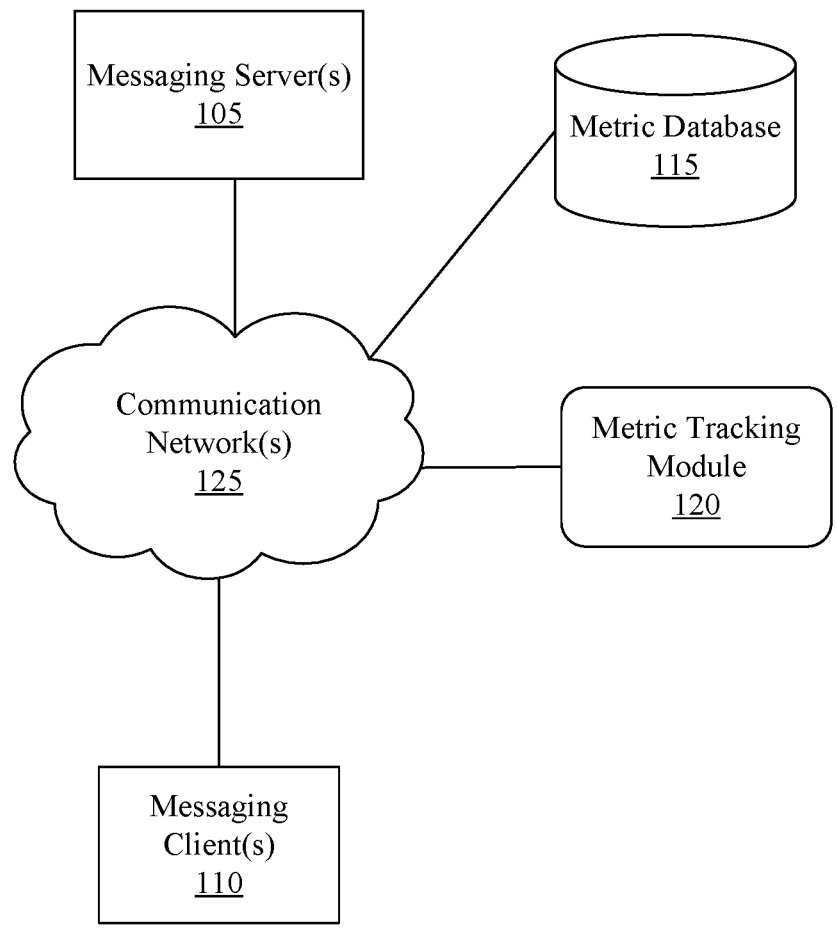
FIG. 1 is a block diagram illustrating a system for adjusting an alert trigger associated with a metric in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating a system 100 for automatically adjusting alert triggers for a metric in accordance with one embodiment of the present invention. The system 100 can include one or more servers 105, one or more clients 110, and a metrics database 115. The system 100 further can include a metric tracking module 120. The metric tracking module 120 and/or the metrics database 115 can be components of the sever 105, or the metric tracking module 120 and/or the metrics database 115 can be executed on and/or distributed among other processing systems to which the server 105 is communicatively linked.

The various components of system 100 can be communicatively linked through one or more communication networks 125. As used herein, the term "communicatively linked" can include direct or indirect connections through a communication channel or pathway or another component or system. A "communication network" means one or more components designed to transmit and/or receive information from one source to another.

The one or more communication networks 125 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 125 further can be implemented as or include one or more wireless networks, whether short or long range. For example, in terms of short range wireless networks, the communication network 125 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 125 can include a mobile, cellular, and or satellite-based wireless network and support voice, video, text, and/or any combination thereof. Examples of long range wireless networks can include GSM, TDMA, CDMA, WCDMA networks or the like. The communication network 125 can include wired communication links and/or wireless communication links. The communication network 125 can include any combination of the above networks and/or other types of networks. The network can include one or more routers, switches, access points, wireless access points, and/or the like.

The one or more servers 105 can be implemented as, for example, an electronic mail system, an instant messaging (IM) system, a Short Messaging System (SMS), or the like. In this regard, the one or more alert servers 105 can be implemented as an electronic mail server, an instant messaging server, an SMS server, or other communication hub or server capable of routing and storing alerts within or as part of the communication network 125. As a further example, the one or more servers 105 can be implemented as, for example, a change management system, a task management system, a project management system, a quality control system or a management tracking system. In this regard, the one or more messaging servers 105 can be implemented as a respective system server capable of routing and storing electronic messages within or as part of the communication network 125. Of course, the one or more servers 105 can be any combination of these examples. In any case, the messaging server 105 can include suitable operational software for performing the various functions described herein.

The client(s) 110 can be implemented as any of a variety of communication devices executing suitable communication software. For example, each client 110 can be implemented as a computer system or other information processing system. One or more of the clients 110 may also be implemented as a portable or mobile computing device, e.g., a mobile telephone, a smart phone, a wireless-enabled personal digital assistant, a portable computer, e.g., laptop, tablet or the like. Each client 110 can include and/or execute suitable communication software, which enables the client 110 to communicate with the server 105 and/or other clients through the communication network 125 and perform the functions disclosed herein. For instance, the client(s) 110 can be an IM client, an electronic mail client, an SMS client, a system client, a change management client, a task management client, a project management client, a quality control system client, a management tracking system client, etc.

The system 100 can include a metric tracking module 120. In one embodiment, the metrics tracking module 120 can be stored on, accessed by and/or executed on the one or more messaging clients 110. Alternatively or in addition, the metrics tracking module 120 can be stored on, accessed by and/or executed on the messaging server 105.

The metrics tracking module 120 can be implemented as computer readable program code that, when executed by a processor, implement the various processes described herein. The metric tracking module 120 and/or the metrics database 115 can include one or more metrics that are relevant to the business or the issue at hand. The metric can be any suitable metric. For instance, the metric can be revenue, sales or customer satisfaction for one or more goods and/or services that may be offered by a business. It can also be used in other contexts, such as software development. In such case, the metric can be one or more milestones in the development of software.

The metrics tracking module 120 can collect data relevant to one or more of the metrics that the module tracks. The data can be collected in any suitable manner by the metrics tracking module 120. The data collection can be performed on any suitable basis, such as continuous, periodic, irregular or even randomly. The collected data can be stored in the metrics database 115. In one embodiment, the metrics database 115 can be stored on, accessed by and/or executed on the one or more messaging clients 110. Alternatively or in addition, the metrics database 115 can be stored on, accessed by and/or executed on the messaging server 105. It should be appreciated that while a single database is illustrated in FIG. 1, a plurality of databases, each storing one or more metrics and other data items associated therewith can be included.

One or more alert trigger thresholds can be associated with each of the metrics. The "alert trigger threshold" is a set of one or more predetermined conditions that, when met, causes or triggers the occurrence of a predefined action. The alert trigger thresholds can be any suitable condition as specified by a user. For instance, the alert trigger thresholds can be a predetermined change in a metric over a predetermined period of time. As an example, the metric can be business revenue, and the alert trigger threshold can be an amount of change in revenue over a period of time, which can be defined in any suitable manner (e.g. a percentage drop or an absolute drop).

One or more predetermined actions can be associated with each alert trigger threshold. Thus, when the alert trigger threshold is met, a predetermined action is initiated. The action can be any suitable action, including, for example, automatically sending an alert notification. In such case, one or more users can be associated with the metric to receive the alert notification. For instance, key personnel of the business who can influence the particular metric can be selected as the recipients of the alert notification.

Alternatively or in addition, the action can be the creation of an entry in the metric database 115. The entry can include any suitable data or information regarding the alert trigger. For instance, the data entry can include the date that the alert trigger threshold was met, the nature of the trigger, a description of the alert trigger, the underlying data that caused the alert trigger threshold to be met, the time that an alert rigger notification was sent, an identifier (e.g., name, electronic mail address, etc.) of the recipients of the alert notification.

The metrics tracking module 120 can be configured to analyze data collected by the system. "Analyze data" is intended to mean any manipulation of the collected data, including any mathematical, statistical or other analysis or operations. Examples include summation, percentages, averaging, etc. Further, the metrics tracking module 120 can compare the collected data to one or more alert trigger thresholds associated with one or more of the metrics to determine whether any alert trigger thresholds are met. If the module 120 determines that an alert trigger threshold is met, an action associated with the alert trigger threshold can be initiated. The analysis by the metrics tracking module 120 can be performed on any suitable basis, such as continuously, periodically, irregularly, randomly or in response to a user input or command.

In one implementation, the action can be automatically sending an alert notification to one or more predetermined recipients. The alert notification can be provided in any suitable form, such as, for example, an electronic mail message, an instant message (IM), a Short Messaging System (SMS), or a system message (e.g. a message in a task management system, a project management system, a quality control system, a management tracking system, etc.). The alert notification can be created within one of the servers 105, clients 110, metric tracking module 120 or other system.

As used herein, a "recipient" of an alert notification can be a user or communication address of a user specified in a "to" field of an electronic message. A recipient further can be a user or communication address specified in another field such as a "carbon copy" or "cc" field, a "blind copy" or "bc" field, or the like. Any user or communication address of a user that receives an electronic message can be considered a recipient of that electronic message. Within this specification, the term "user" and "communication address" may be used interchangeably as each refers to a particular online entity, user identity, or profile. Likewise, the terms "sender" or "recipient" also may be used to refer to a "user" or a "communication address" of a user as the case may be.

Figure 3:
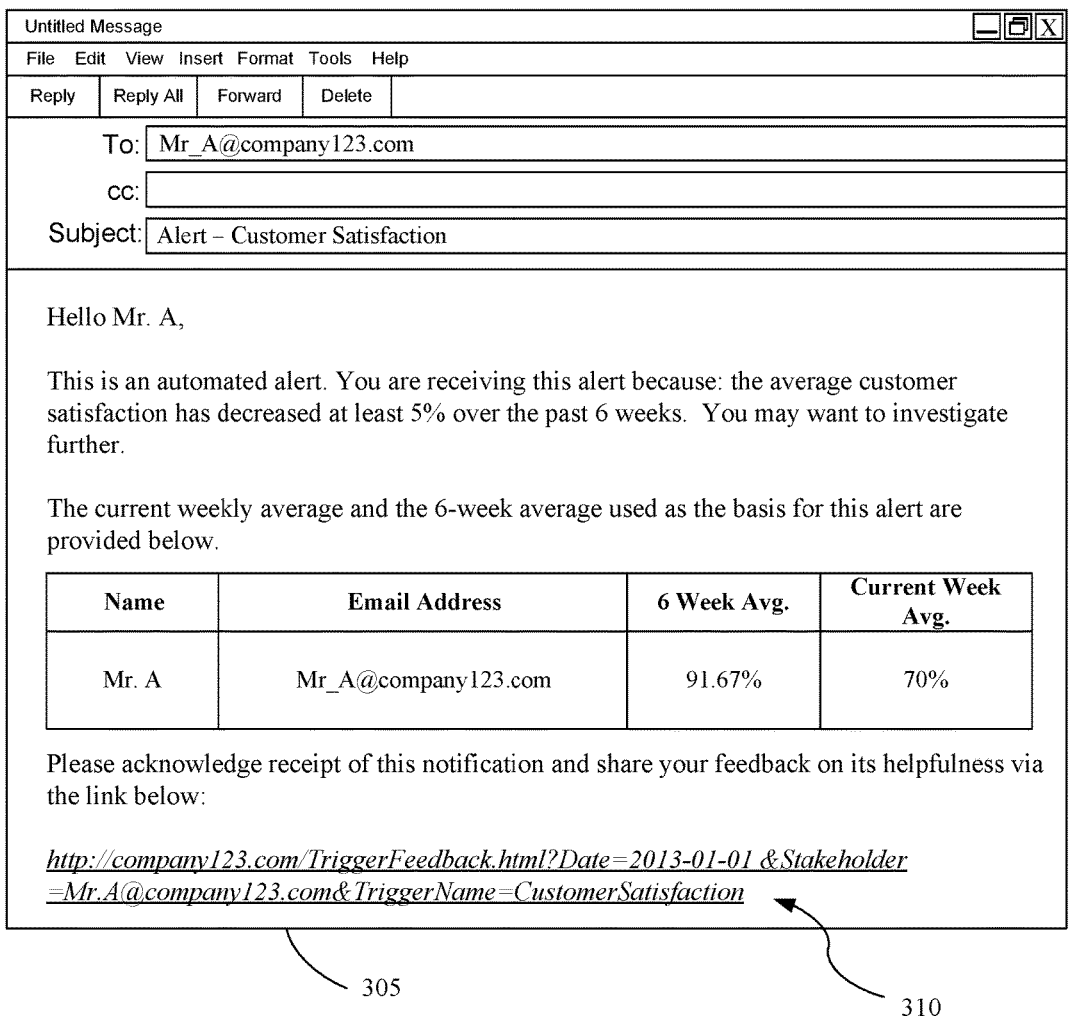
FIG. 3 is an electronic message sent upon the occurrence of an alert trigger associated with a metric in accordance with one embodiment disclosed within this specification.

Again, the alert notification can be sent to one or more users who are associated with a particular metric alert trigger. One example of an alert notification 300 is shown in FIG. 3. In this example, the alert notification is shown as being an electronic mail message 305. However, it will be understood that this is merely an example of one type of alert notification.

Further, the format and content of the alert notification 300 shown in FIG. 3 is merely an example, as it can have any suitable format, content or information. The alert notification 300 can present additional content/information than what is shown in FIG. 3, or it can present less content/information than what is shown in FIG. 3. The alert notification 300 can include information, such as the reason for the sending of the alert notification and/or the data used as the basis for the alert.

The alert notification 300 can be configured to facilitate the confirmation of the user's receipt of the alert notification and/or to facilitate the providing of feedback as to one or more aspects of the alert notification. For instance, the alert notification 310 can include a hyperlink, which can include a uniform resource locator (URL) 310 provided in the electronic mail message 305.

Thus, when the URL is selected by the user, the data in the metric tracking database 115 can be updated to indicate that the user has received the alert notification. Further, when the URL is selected by the user, the user can be presented a user interface for receiving feedback from the user. A "user interface" is defined as a component, system or arrangement or groups thereof that enable information/data to be entered into a machine.

The user interface can have any suitable form. FIG. 4 shows an example of one possible user interface 400. In this implementation, a feedback page 405 can be presented to the user. The feedback page can present one or more user interface elements to enable a user to provide feedback on one or more aspects of the received alert notification. A "user interface element" is defined as a component or a group of components that enables a user to interact with a machine. Such fields can be generally arranged in any suitable manner. An example of one arrangement is shown in FIG. 4. However, it will be understood that the field can be arranged differently and may include additional or fewer user interface elements.

The user interface elements can include one or more fields. For instance, there can be a trigger identification field 410, the trigger action date field 415 a user identifier field 420, an alert helpfulness field 425 and an additional comments field 430. The trigger identification field 410 can provide or receive a description of the trigger and/or some information as to the nature of the trigger. The trigger action date field 415 can provide or receive information as to the date in which the alert threshold was triggered and the associated action initiated. The user identifier field 420 can include an identifier of the recipient (e.g., the user's name, electronic mail address, etc.). The alert helpfulness field 425 can receive a user feedback input as to the timeliness of the alert notification. The additional comments field 430 can receive any input from a user. Again, these fields are merely provided as examples.

One or more of the fields can be configured to receive feedback by user input. In some instances, the user may have to manually input data into one or more of the fields. The fields can be configured to minimize the amount of data entered by a user or otherwise facilitate user input. For instance, one or more fields can be automatically populated with data. As an example, the trigger identification field 410, the trigger action date field 415 and the user identifier field 420 may be automatically populated. In some implementations, the user may be able to modify the automatically populated data.

In other instances, one or more fields can graphical user interface element, such as menu of choices from which the user can select an appropriate input. For instance, a drop down menu button 435 can be provided to facilitate the user's input. In such case, when the button 435 is selected, the user may be presented with a list of one or more predetermined inputs for the alert helpfulness field 425. In one implementation, the predetermined inputs for the alert helpfulness field 425 can include: "Yes.", "No. Alert notification came too early.", or "No. Alert notification came too late." Again, the inputs are provided merely as examples. Indeed, there can be additional predetermined inputs, or one or more of these inputs may not be provided. Further, the predetermined inputs can be different than these examples.

In still other instances, one or more fields can be configured to receive a free-form input from a user. For instance, the additional comments field 430 can be configured to receive text input manually by a user. The user can provide any comments that may be relevant to the alert notification. For instance, the user may indicate that the alert trigger threshold is not correctly set and may express what a more helpful alert trigger threshold. The user may input an action plan for addressing the metric.

The feedback input from the one or more users can be required as acknowledgement of part of a business process, thereby creating a closed loop process. The input received from the user can be stored in the database the feedback in the metric database 115. The user input can be used to update the entry created in the database 115 when the alert trigger threshold was met. For instance, the database 115 can be updated to include whether the recipients of the alert notification responded, the time of any such response, and the feedback inputs provided by the user. Over a time, a repository of feedback on the usefulness or helpfulness of one or more alert trigger thresholds can be compiled. The information can be reviewed to ensure that the alert trigger thresholds are appropriate. The alert trigger threshold can be adjusted based on the received feedback.

It should be appreciated that the sending of an alert notification, receiving feedback on the alert notification from one or more user and/or adjusting the alert trigger threshold based on the received feedback as described herein can be performed by the one or more servers 105 and/or the one or more clients 110, or any combination thereof depending upon the particular implementation. Alternatively or in addition, the metric tracking module 120 can perform the sending of an alert notification, receiving feedback on the alert notification from one or more user and/or adjusting the alert trigger threshold based on the received feedback as described herein and may be invoked by the one or more clients 110 and/or the one or more servers 105.

FIG. 2 is a flow chart illustrating a method 200 of automatically adjusting an alert trigger threshold associated with a metric in accordance with one embodiment disclosed within this specification. At step 205, responsive to a determination that a predetermined alert trigger threshold associated with a metric is met, an alert notification can be sent to a plurality of users associated with the metric. At step 210, feedback on the alert notification from one or more of the plurality of users can be received. At step 215, the alert trigger threshold based on the received feedback can be adjusted. After the alert trigger threshold is adjusted, an alert notification can be sent responsive to a determination that the adjusted alert trigger threshold associated with the metric is met. If the feedback is not supportive of an adjustment to the alert trigger threshold, the alert trigger threshold can remain unchanged.

Assessment of the received feedback and the adjustment of the alert trigger threshold can be performed on any suitable basis. In some implementations, the assessing and adjusting of the alert trigger threshold can be performed when a predetermined condition is met. In this way, adjustments are made to the alert trigger notification when there is sufficient support for the adjustment. As an example, the alert trigger threshold can be adjusted once a predetermined quantity of feedback is received from users. In some instance, the alert trigger threshold can be adjusted once a predetermined quantity of feedback is received from unique users.

Alternatively or in addition, the assessing and adjusting can be performed after a predetermined level of agreement is reached in the feedback received from the plurality of users. For instance, an adjustment to the alert trigger threshold can be made if there is at least 70%, at least 75%, at least 80%, at least 85%, at least 90% or at least 95% agreement on the direction in which the alert trigger threshold should be adjusted.

Alternatively or in addition, the alert trigger threshold can be assessed and/or adjusted after the passage of a predetermined amount of time. For instance, feedback received from users can be reviewed daily, weekly, monthly, quarterly, semi-annually, or annually.

Of course, combinations of the above configurations are possible. For instance, the alert trigger threshold can be adjusted if the feedback from a predetermined number of unique users is received and there is a predetermined minimum level of agreement on the direction that the trigger needs to be adjusted.

In some implementations, the feedback received from users can be assigned equal weight. In other implementations, the feedback received from users can be unequally weighted in any suitable manner. For instance, user feedback can be assigned a weight based on the rank of the individual user within a business, organization or other group of a plurality of users. For instance, users who are in management or who have specialized knowledge can be assigned a rank or weighting that is greater than other users. Consequently, such users can have a greater influence over whether an alert trigger threshold is adjusted and the direction and/or amount which an alert trigger threshold is adjusted.

In some implementations, the alert trigger threshold can be configured so that it can be adjusted in a plurality of ways and even in different directions. For instance, there may be a level of agreement among a first set of one or more users that the current alert trigger threshold is set too high, whereas there may be a level of agreement among a second set of one or more users that the current alert trigger threshold is set too low. In such case, the alert trigger threshold can be adjusted in a first respect for the first set of one or more users, and the alert trigger threshold can be adjusted in a second respect for the second set of one or more users. In this way, the users can receive an alert notification tailored to their individual preferences.

Further, the amount of adjusting can be limited to prevent too large of an adjustment in any direction. For instance, limits can be placed so that the maximum adjustment to an alert trigger threshold is a predetermined amount (e.g. number, increment, percentage, etc.) in any direction. As an example, if a sufficient percentage of users agree that the alert notification was sent too early, then the alert trigger threshold can be adjusted one predetermined increment in a direction that would cause the alert notification to be sent later. Alternatively, if the adjustment to the alert trigger threshold exceeds a predetermined amount, one or more users associated with the particular metric can be notified of the adjustment.

In some implementations, there may be limits on the number of times that an individual user may provide feedback on a particular alert trigger associated with a metric. For instance, an individual user may be allowed a maximum number of feedback inputs in a predetermined period of time. In some cases, an individual user may perceive the helpfulness or usefulness of a particular alert notification differently at different points in time. Thus, arrangements herein can be configured to indicate that duplicate consecutive feedback on a particular alert notification can be prohibited or ignored.

Arrangements described herein can collect data for adjusting a metric over time based on feedback given by users who are associated with the metric. Such adjusting can facilitate sending alert notifications at an optimal time, thereby maximizing the value of the alert notifications. As a result, it can allow the key personnel sufficient time to take corrective action to a situation. Arrangements herein can also minimize the likelihood of alert notifications being prematurely sent to key personal, which may otherwise be ignored or deleted or otherwise waste the recipient's time.

Further, arrangements herein can facilitate management review of the responsiveness of users to the alert notifications. Arrangements herein can provide an opportunity to review the reasons given by the key personnel for adjusting the alert. Such reasons can be subsequently reviewed by management or others to validate them, giving a level of accountability, continuously driving improvement in an organization. Arrangements herein can also provide an opportunity to review the effectiveness of action plans input by users as feedback to an alert notification. The action plan can be overlaid with the actual results. It may become clear whether the problem was a lack of committing to the stated action plan or that the action stated did not address the problem. Thus, arrangements herein can provide a further tool to validate responses and/or increase a level of accountability.

Figure 5:
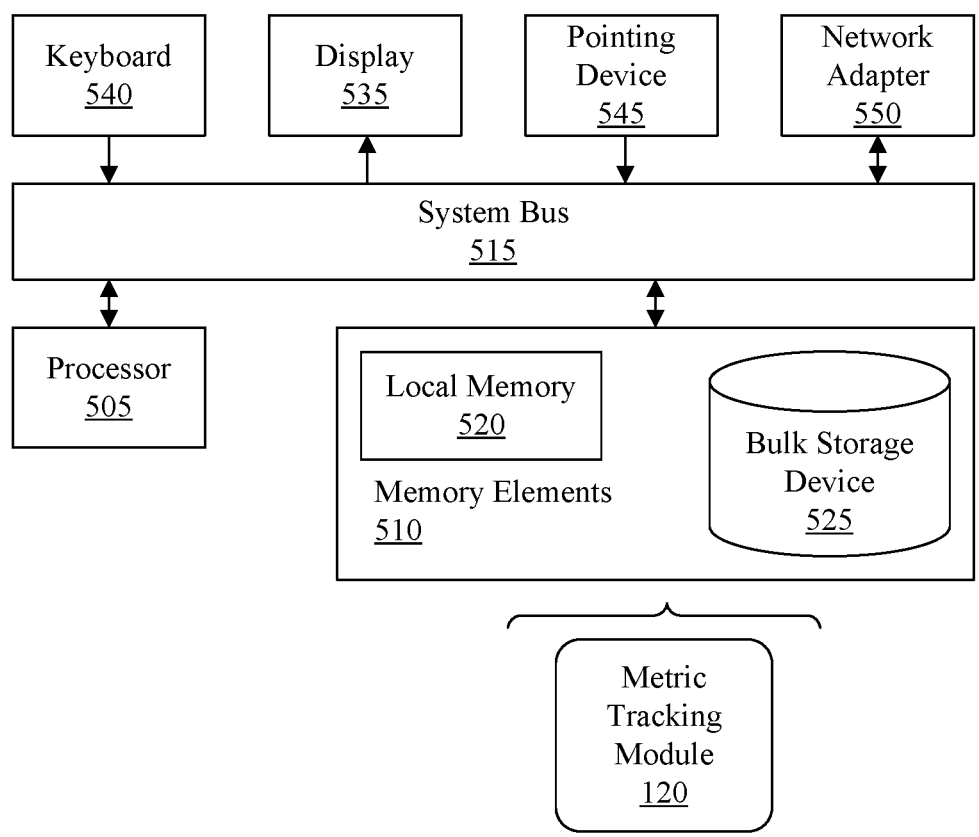
FIG. 5 is a block diagram illustrating a system for adjusting an alert trigger associated with a metric in accordance with one embodiment disclosed within this specification.

FIG. 5 is a block diagram illustrating an example of a data processing system 500. System 500 can include at least one processor (e.g., a central processing unit) 505 coupled to memory elements 510 through a system bus 515 or other suitable circuitry. As such, system 500 can store program code within memory elements 510. Processor 505 executes the program code accessed from memory elements 510 via system bus 515 or the other suitable circuitry.

In one aspect, system 500 is implemented as a computer or other programmable data processing apparatus that is suitable for storing and/or executing program code. It should be appreciated, however, that system 500 can be implemented in the form of any system including a processor and memory that is capable of performing and/or initiating the functions and/or operations described within this specification. Further, system 500 can be implemented in any of a variety of different form factors including, but not limited to, a portable device such as a mobile communication device, a tablet computing and/or communication device, a laptop computing device, a desktop computing device, a server, or the like.

Memory elements 510 include one or more physical memory devices such as, for example, local memory 520 and one or more bulk storage devices 525. Local memory 520 refers to RAM or other non-persistent memory device(s) generally used during actual execution of the program code. Bulk storage device(s) 525 can be implemented as a hard disk drive (HDD), solid state drive (SSD), or other persistent data storage device. System 500 also can include one or more cache memories (not shown) that provide temporary storage of at least some program code in order to reduce the number of times program code must be retrieved from bulk storage device 525 during execution.

Input/output (I/O) devices such as a keyboard 540, a display 535, and a pointing device 545 optionally can be coupled to system 500. The I/O devices can be coupled to system 500 either directly or through intervening I/O controllers. One or more network adapters 550 also can be coupled to system 500 to enable system 500 to become coupled to other systems, computer systems, remote printers, and/or remote storage devices through intervening private or public networks. Modems, cable modems, wireless transceivers, and Ethernet cards are examples of different types of network adapters 550 that can be used with system 500.

As pictured in FIG. 1, memory elements 510 can store a metric tracking module 120. The metric tracking module 120, being implemented in the form of executable program code, is executed by system 500 and, as such, is considered an integrated part of system 500. The metric tracking module 120 can determine whether a predetermined alert trigger threshold associated with a metric is met and, if so, send an alert notification to one or more users associated with the metric. The metric tracking module 120 can receive feedback on the alert notification from the users. The metric tracking module 120 can adjust the alert trigger threshold based on the received feedback. Moreover, the metric tracking module 120, including any parameters and/or attributes utilized by module 120, are functional data structures that impart functionality when employed as part of system 500.

Each of the adjusted metric alert trigger thresholds can be output to, and stored within, memory elements 510. As used herein, "outputting" and/or "output" can mean storing in memory elements 510, for example, writing to a file stored in memory elements 510, writing to display 535 or other peripheral output device, playing audible notifications, sending or transmitting to another system, exporting, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method, comprising:
   determining that a predetermined alert trigger threshold directly associated with a metric is met;
   sending, responsive to the determining and to a plurality of users associated with the metric, an electronic message including an alert notification and a hyperlink;
   receiving, responsive to one of the plurality of users selecting the hyperlink, feedback on the alert notification; and
   adjusting the alert trigger threshold based on the received feedback, wherein
   the alert trigger threshold is adjusted only after a predetermined quantity of feedback is received from at least two of the plurality of users.

2. The method of claim 1, wherein
   the electronic message is an email.

3. The method of claim 1, wherein
   the alert trigger threshold is adjusted after a predetermined level of agreement is reached in the feedback from at least two of the plurality of users.

4. The method of claim 1, wherein
   the alert trigger threshold is adjusted by a predetermined amount.

5. The method of claim 1, wherein
   upon selecting the hyperlink, the one of the plurality of users is presented with a user interface through which the feedback is received.

6. A computer hardware system, comprising:
   a hardware processor configured to initiate the following operations:
      determining that a predetermined alert trigger threshold directly associated with a metric is met;
      sending, responsive to the determining and to a plurality of users associated with the metric, an electronic message including an alert notification and a hyperlink;
      receiving, responsive to one of the plurality of users selecting the hyperlink, feedback on the alert notification; and
      adjusting the alert trigger threshold based on the received feedback, wherein
   the alert trigger threshold is adjusted only after a predetermined quantity of feedback is received from at least two of the plurality of users.

7. The system of claim 6, wherein
   the electronic message is an email.

8. The system of claim 6, wherein
   the alert trigger threshold is adjusted after a predetermined level of agreement is reached in the feedback from at least two of the plurality of users.

9. The system of claim 6, wherein
   the alert trigger threshold is adjusted by a predetermined amount.

10. The system of claim 6, wherein
    upon selecting the hyperlink, the one of the plurality of users is presented with a user interface through which the feedback is received.

11. A computer program product, comprising:
    a computer readable hardware storage device having program code embodied therewith,
    the program code, which when executed by a computer hardware system, causes the computer hardware system to perform:
       determining that a predetermined alert trigger threshold directly associated with a metric is met;
       sending, responsive to the determining and to a plurality of users associated with the metric, an electronic message including an alert notification and a hyperlink;
       receiving, responsive to one of the plurality of users selecting the hyperlink, feedback on the alert notification; and
       adjusting the alert trigger threshold based on the received feedback, wherein
    the alert trigger threshold is adjusted only after a predetermined quantity of feedback is received from at least two of the plurality of users.

12. The computer program product of claim 11, wherein
    the electronic message is an email.

13. The computer program product of claim 11, wherein
    the alert trigger threshold is adjusted after a predetermined level of agreement is reached in the feedback from at least two of the plurality of users.

14. The computer program product of claim 11, wherein
    the alert trigger threshold is adjusted by a predetermined amount.

15. The computer program product of claim 11, wherein
    upon selecting the hyperlink, the one of the plurality of users is presented with a user interface through which the feedback is received.

* * * * *